United States Patent
Sprague et al.

(10) Patent No.: US 11,474,422 B2
(45) Date of Patent: Oct. 18, 2022

(54) REFLECTIVE COLOR CORRECTION FOR PHOSPHOR ILLUMINATION SYSTEMS

(71) Applicant: MATERION CORPORATION, Mayfield Heights, OH (US)

(72) Inventors: Robert Sprague, Mayfield Heights, OH (US); Michael P. Newell, Mayfield Heights, OH (US)

(73) Assignee: MATERION CORPORATION, Mayfield Heights, OH (US)

( * ) Notice: Subject to any disclaimer, the term of this patent is extended or adjusted under 35 U.S.C. 154(b) by 0 days.

(21) Appl. No.: 17/057,371

(22) PCT Filed: Jul. 25, 2019

(86) PCT No.: PCT/US2019/043371
§ 371 (c)(1),
(2) Date: Nov. 20, 2020

(87) PCT Pub. No.: WO2020/023708
PCT Pub. Date: Jan. 30, 2020

(65) Prior Publication Data
US 2021/0191246 A1    Jun. 24, 2021

Related U.S. Application Data

(60) Provisional application No. 62/703,971, filed on Jul. 27, 2018.

(51) Int. Cl.
*G03B 21/20* (2006.01)
*G03B 33/06* (2006.01)

(52) U.S. Cl.
CPC ....... *G03B 21/204* (2013.01); *G03B 21/2066* (2013.01); *G03B 33/06* (2013.01)

(58) Field of Classification Search
CPC .......................... G03B 21/204; G03B 21/2066
See application file for complete search history.

(56) References Cited

U.S. PATENT DOCUMENTS

| 5,747,152 A | * | 5/1998 | Oka | G02B 1/111 428/323 |
| 5,976,297 A | * | 11/1999 | Oka | B32B 38/10 156/241 |
| 6,150,022 A | * | 11/2000 | Coulter | C09C 1/0015 106/499 |

(Continued)

FOREIGN PATENT DOCUMENTS

WO    WO-2012138020 A1 * 10/2012 ........... G03B 21/204

OTHER PUBLICATIONS

Alla Petukhova et al.; Extinction analysis of dielectric multilayer microspheres; Applied Physics Letter, vol. 90, No. 21, Nov. 20, 2006; p. 211908.

(Continued)

*Primary Examiner* — Bao-Luan Q Le
(74) *Attorney, Agent, or Firm* — Tucker Ellis LLP (57) ABSTRACT

Wavelength conversion elements formed from phosphors and dielectric interference particles dispersed in a host material, either in a single layer or in separate layers, are disclosed. Optical light conversion devices having such wavelength conversion elements, methods of making such wavelength conversion elements, and methods of using such wavelength conversion elements are also disclosed.

23 Claims, 5 Drawing Sheets

(56) References Cited

U.S. PATENT DOCUMENTS

| | | | | |
|---|---|---|---|---|
| 6,335,832 | B1* | 1/2002 | Oka | B29C 70/64 359/582 |
| 6,383,638 | B1* | 5/2002 | Coulter | C09C 1/0015 106/404 |
| 6,387,498 | B1* | 5/2002 | Coulter | C09C 1/0015 106/404 |
| 6,476,969 | B2* | 11/2002 | Oka | B29D 11/00 359/582 |
| 6,517,628 | B1* | 2/2003 | Pfaff | C09D 5/36 106/417 |
| 6,565,770 | B1* | 5/2003 | Mayer | C09C 1/0015 252/301.36 |
| 6,572,784 | B1* | 6/2003 | Coombs | B82Y 10/00 427/218 |
| 6,586,098 | B1* | 7/2003 | Coulter | C09C 1/0024 428/403 |
| 6,699,313 | B2* | 3/2004 | Coulter | C09C 1/0024 106/31.6 |
| 6,743,285 | B1* | 6/2004 | Anselmann | A61K 8/11 106/415 |
| 6,793,720 | B2* | 9/2004 | Muller | C09D 13/00 106/31.07 |
| 7,485,183 | B2* | 2/2009 | Hochstein | A61K 8/0262 106/499 |
| 8,500,901 | B2* | 8/2013 | Rueger | C09C 1/0024 106/415 |
| 8,658,184 | B2* | 2/2014 | Schulz | A61K 8/0254 424/401 |
| 9,733,557 | B2* | 8/2017 | Furuyama | G03B 21/204 |
| 9,863,604 | B2* | 1/2018 | Ikeda | F21V 9/30 |
| 9,952,491 | B2* | 4/2018 | Ikesue | G03B 21/005 |
| 10,698,307 | B2* | 6/2020 | Watanabe | G02B 27/0955 |
| 10,721,446 | B2* | 7/2020 | Hashizume | H04N 9/3158 |
| 10,775,686 | B2* | 9/2020 | Ohkoba | G02B 5/0242 |
| 2002/0051295 | A1* | 5/2002 | Oka | B29D 11/00 359/586 |
| 2002/0180351 | A1* | 12/2002 | McNulty | B82Y 20/00 313/512 |
| 2003/0056688 | A1* | 3/2003 | Muller | C09D 13/00 106/31.07 |
| 2003/0207113 | A1* | 11/2003 | Coulter | C09C 1/0015 428/403 |
| 2004/0191198 | A1* | 9/2004 | Hochstein | C09C 1/0081 424/63 |
| 2006/0225609 | A1* | 10/2006 | Rueger | C09C 1/0024 106/31.9 |
| 2007/0225424 | A1* | 9/2007 | Schulz | A61K 8/0254 524/494 |
| 2007/0278935 | A1* | 12/2007 | Harada | C09K 11/0883 313/503 |
| 2007/0289496 | A1* | 12/2007 | Kieser | C09C 1/0033 106/287.19 |
| 2008/0107841 | A1* | 5/2008 | Remillard | C09D 7/70 428/29 |
| 2009/0220557 | A1* | 9/2009 | Pfaff | A61Q 1/02 424/401 |
| 2009/0246294 | A1* | 10/2009 | Hochstein | A61Q 19/10 424/646 |
| 2010/0175587 | A1* | 7/2010 | Rueger | C09C 1/0069 106/403 |
| 2011/0300200 | A1* | 12/2011 | Pfaff | A61K 8/19 424/401 |
| 2013/0108569 | A1* | 5/2013 | Hochstein | A61Q 5/06 424/63 |
| 2014/0022779 | A1* | 1/2014 | Su | F21V 9/38 362/231 |
| 2014/0255608 | A1* | 9/2014 | Eibon | B05D 7/572 427/380 |
| 2015/0316839 | A1* | 11/2015 | Jeoung | G03B 21/204 362/19 |
| 2016/0040857 | A1* | 2/2016 | Inoue | F21V 13/14 362/343 |
| 2016/0061391 | A1* | 3/2016 | Inoue | F21V 5/005 362/84 |
| 2016/0230012 | A1* | 8/2016 | Hochstein | A61K 8/25 |
| 2016/0238922 | A1* | 8/2016 | Furuyama | G03B 21/204 |
| 2017/0023188 | A1 | 1/2017 | Kazuma | |
| 2017/0045732 | A1* | 2/2017 | Chang | G02B 5/26 |
| 2017/0160627 | A1* | 6/2017 | Ikesue | G03B 21/16 |
| 2017/0227192 | A1* | 8/2017 | Ikeda | G03B 21/16 |
| 2017/0328541 | A1 | 11/2017 | Hiroyuki | |
| 2017/0343890 | A1* | 11/2017 | Ohkoba | G02B 5/0242 |
| 2018/0171151 | A1* | 6/2018 | Argoitia | C09C 1/64 |
| 2018/0220685 | A1* | 8/2018 | Peters | C09C 1/0039 |
| 2018/0223103 | A1* | 8/2018 | Schweinfurth | A23P 20/10 |
| 2018/0307128 | A1* | 10/2018 | Joseph | G03B 21/005 |
| 2019/0187543 | A1* | 6/2019 | Watanabe | F21S 8/026 |
| 2019/0239544 | A1* | 8/2019 | Schweinfurth | A23L 5/43 |
| 2020/0026171 | A1* | 1/2020 | Hsieh | B32B 7/12 |
| 2020/0409250 | A1* | 12/2020 | Zhang | G03B 21/204 |
| 2021/0116795 | A1* | 4/2021 | Morita | G03B 21/204 |
| 2021/0208491 | A1* | 7/2021 | Tanaka | G03B 21/14 |

OTHER PUBLICATIONS

Intl. Search Report PCT/US2019/043371; 3 pgs.; dated Oct. 10, 2019.

PCT/US2019/043371; 5 pgs. International Written Opinion of the Intl. Searching Authority; dated Oct. 10, 2019.

\* cited by examiner

REFLECTIVE COLOR CORRECTION FOR PHOSPHOR ILLUMINATION SYSTEMS

CROSS-REFERENCE TO RELATED APPLICATIONS

This application claims priority to U.S. Provisional Patent Application Ser. No. 62/703,971, filed Jul. 27, 2018, which is hereby fully incorporated by reference in its entirety.

BACKGROUND

The present disclosure relates to the phosphor arts, wavelength conversion arts, and related arts, and to optoelectronic, photonic, and like applications using same such as (but not limited to) projection displays (e.g. digital light processing, DLP), automotive lighting, and so forth. In particular, the present disclosure relates to wavelength conversion elements including phosphor(s) and dielectric interference particles. The phosphor(s) and the dielectric interference particles can be dispersed together in a host material to form a single layer, or they may be placed in separate adjacent layers of the wavelength conversion element. Also disclosed are optical light conversion devices having such wavelength conversion elements, methods of making such wavelength conversion elements, and methods of using such wavelength conversion elements.

Wavelength conversion elements are known for converting light wavelengths, usually down-converting from a shorter wavelength to one or more longer wavelengths through the use of phosphors. The wavelength conversion element is energized, or "pumped" by a laser diode, light emitting diode (LED), or other light source and phosphoresces or fluoresces, emitting the light of a different wavelength. The wavelength conversion element may be static (i.e., not moving during operation) or, for example mounted on a rotating wheel (i.e., a phosphor wheel device), which distributes heating from the pump beam over a larger area. A phosphor wheel device can also advantageously provides a time sequence of different colors (or, more generally, different phosphorescence spectra) by using different phosphors in different wavelength conversion elements (i.e., different arc segments) disposed along the rim of the phosphor wheel. Periods of zero emission can also be provided by leaving gaps between neighboring phosphor arc segments (with the pumped light being reflected if desired). Such a phosphor wheel can be used, for example, to provide sequential red, green, and blue light for a Digital Light Processing (DLP) projector or other DLP display device.

Conventional pumped illuminators are efficient at producing red and yellow light, but the blue pump light is absorbed by the phosphors. As a result, the emitted light must be color corrected by adding blue light to obtain white light.

BRIEF DESCRIPTION

The present disclosure relates to wavelength conversion elements including phosphors and dielectric interference particles, and to optical light conversion devices having such wavelength conversion elements, methods of making such wavelength conversion elements, and methods of using such wavelength conversion elements. The phosphor(s) and the dielectric interference particles can be placed in the same layer, or in separate layers. The dielectric interference particles selectively reflect at least a portion of the blue light used as the excitation light. The dielectric interference particles are highly tunable to obtain the desired performance without absorption loss and heating. This method of color correction is particularly suitable for high power levels and high radiance.

Disclosed in exemplary embodiments herein are wavelength conversion elements, comprising: at least one host material; one or more phosphors; and one or more dielectric interference particles.

In some embodiments, the one or more phosphors and the one or more dielectric interference particles are dispersed throughout a common host material, forming a single layer.

In other embodiments, the wavelength conversion element includes (A) a phosphor layer formed from the one or more phosphors and the host material (but not the dielectric interference particles), and (B) a particle layer formed from the one or more dielectric interference particles and the host material (but not the phosphors). Put another way, the phosphors are selectively enriched in one part of the host material, and the dielectric interference particles are selectively enriched in a different part of the host material.

In still other embodiments, the wavelength conversion element includes (A) a phosphor layer formed from the one or more phosphors and a first host material (but not the dielectric interference particles), and (B) a particle layer formed from the one or more dielectric interference particles and a second host material (but not the phosphors). The two layers are joined together to form the wavelength conversion element. For example, the phosphor may be in a ceramic host material, and the one or more dielectric interference particles may be in an inorganic host material.

In particular embodiments, the one or more dielectric interference particles can be in the form of flakes or grains comprising a plurality of thin film layers. Each particle flake or grain has a sufficiently small lateral dimension (i.e. width or length) that a nearly continuous distribution of reflected light is obtained. Typically, the lateral dimension is less than 100 micrometers (µm). The flakes/grains are present in a sufficient concentration to obtain the nearly continuous distribution of reflected light.

In circumstances where white light is desired to be obtained, the one or more phosphors can include a green light-emitting phosphor, a red light-emitting phosphor, and/or a yellow light-emitting phosphor. The one or more dielectric interference particles at least partially reflects blue light while transmitting light of other wavelengths. The host material(s) can, in certain embodiments, be a glass host material, a ceramic host material, a silicone host material, an optical glue or adhesive, or generally any material with suitable thermal, optical and tribological properties. Particular embodiments are contemplated that have two different phosphors that emit two different colors, particularly a red light-emitting phosphor and a yellow light-emitting phosphor.

Further disclosed in exemplary embodiments herein are optical light conversion devices comprising; a substrate; and a first wavelength conversion element secured to a front surface of the substrate, the wavelength conversion element including one or more phosphors and one or more dielectric interference particles, the phosphor(s) and particle(s) being located within the host material.

The substrate may have a rectangular shape or a disk shape, or a parabolic or hyperbolic shape, and generally can have any arbitrary shape. The disk shape permits the light conversion device to be used as a phosphor wheel, with the substrate having a central axis around which the substrate can be rotated. The first wavelength conversion element may be located on an outer perimeter of the substrate. A second wavelength conversion element may also be present on the substrate, with the second wavelength conversion element using a phosphor that emits a different color than the phosphor of the first wavelength conversion element.

Also disclosed in exemplary embodiments herein are methods of manufacturing a wavelength conversion element, comprising: dispersing at least one phosphor and one or more dielectric interference particles in a host material. This dispersion can be injected into a mold, pressed and sintered, or otherwise formed to define the shape of the wavelength conversion element. The wavelength conversion element can then be secured to a front surface of a substrate. In such methods, the wavelength conversion element is a single layer.

In other embodiments, the wavelength conversion element is made by: applying a mixture comprising a phosphor and a first host material to form a phosphor layer; and applying a mixture comprising one or more dielectric interference particles and the second host material to form a particle layer on the phosphor layer. The first and second host materials can be the same or be different. Either the particle layer can be built upon the phosphor layer, or the phosphor layer can be built upon the particle layer. When affixed to a substrate, the phosphor layer is between the substrate and the particle layer, or put another way the particle layer is between the phosphor layer and the excitation light source, so as to be able to reflect blue light.

Further disclosed in exemplary embodiments herein are light emission methods, comprising: applying blue light to a wavelength conversion element that comprises a host material, one or more phosphors within the host material, and one or more dielectric interference particles within the host material.

These and other non-limiting characteristics of the disclosure are more particularly disclosed below.

BRIEF DESCRIPTION OF THE DRAWINGS

The following is a brief description of the drawings, which are presented for the purposes of illustrating the exemplary embodiments disclosed herein and not for the purposes of limiting the same. In these diagrams the optical system used to collect the light is illustrated with a single reflective surface. However, in practice, both reflective and transmissive optical systems can be used.

FIG. 2A and FIG. 2B illustrate an exemplary embodiment of a light conversion device of the present disclosure, in the form of a phosphor wheel with two segments. FIG. 2A is a side cross-sectional view, and FIG. 2B is a front view.

FIG. 3A and FIG. 3B illustrate an exemplary embodiment of a light conversion device of the present disclosure, in the form of a phosphor wheel. FIG. 3A is a side cross-sectional view, and FIG. 3B is a front view.

DETAILED DESCRIPTION

A more complete understanding of the components, processes and apparatuses disclosed herein can be obtained by reference to the accompanying drawings. These figures are merely schematic representations based on convenience and the ease of demonstrating the present disclosure, and are, therefore, not intended to indicate relative size and dimensions of the devices or components thereof and/or to define or limit the scope of the exemplary embodiments.

Although specific terms are used in the following description for the sake of clarity, these terms are intended to refer only to the particular structure of the embodiments selected for illustration in the drawings, and are not intended to define or limit the scope of the disclosure. In the drawings and the following description below, it is to be understood that like numeric designations refer to components of like function.

The singular forms "a," "an," and "the" include plural referents unless the context clearly dictates otherwise.

As used in the specification and in the claims, the terms "comprise(s)," "include(s)," "having," "has," "can," "contain(s)," and variants thereof, as used herein, are intended to be open-ended transitional phrases, terms, or words that require the presence of the named ingredients/steps and permit the presence of other ingredients/steps. However, such description should be construed as also describing compositions or processes as "consisting of" and "consisting essentially of" the enumerated ingredients/steps, which allows the presence of only the named ingredients/steps, along with any unavoidable impurities that might result therefrom, and excludes other ingredients/steps.

Numerical values in the specification and claims of this application should be understood to include numerical values which are the same when reduced to the same number of significant figures and numerical values which differ from the stated value by less than the experimental error of conventional measurement technique of the type described in the present application to determine the value.

All ranges disclosed herein are inclusive of the recited endpoint and independently combinable (for example, the range of "from 2 grams to 10 grams" is inclusive of the endpoints, 2 grams and 10 grams, and all the intermediate values).

A value modified by a term or terms, such as "about" and "substantially," may not be limited to the precise value specified. The approximating language may correspond to the precision of an instrument for measuring the value. The modifier "about" should also be considered as disclosing the range defined by the absolute values of the two endpoints. For example, the expression "from about 2 to about 4" also discloses the range "from 2 to 4." Generally, the terms "about" and "approximately" may refer to plus or minus 10% of the indicated number.

As used herein, the terms "excitation light" and "excitation wavelength" refer to input light which is subsequently converted, e.g. light produced by a laser-based illumination source or other light source also referred to as the pump. The terms "emission light" and "emission wavelength" refer to the converted light, e.g. the resulting light produced by a phosphor which has been exposed to excitation light.

For reference, the color red usually refers to light having a wavelength of about 780 nanometers to about 622 nanometers. The color green usually refers to light having a wavelength of about 577 nanometers to about 492 nanometers. The color blue usually refers to light having a wavelength of about 492 nanometers to about 430 nanometers. The color yellow usually refers to light having a wavelength of about 597 nanometers to about 577 nanometers. However, this may depend on the context. For example, these colors are sometimes used to label various parts and distinguish those parts from each other.

A light conversion device, such as a phosphor wheel, is used to generate light of different colors (wavelengths) from a single excitation light source. Light conversion (or wavelength conversion) materials such as phosphors are used on the phosphor wheel. The phosphor wheel normally has semi-annular wavelength conversion elements along an outer perimeter of the wheel which contain different types of phosphor to convert the excitation light to a green, yellow, or red color (also known as phosphor segments) sequentially as the wheel rotates. Typically, a blue light laser (having a wavelength of about 440 nm to about 460 nm) is used to excite the phosphor segments on the phosphor wheel. The phosphor wheel can also have one or more gaps to pass or reflect the blue source light itself. Static (i.e. non-moving) light conversion devices are also known.

Conventional diode pumped illuminators (whether a laser diode or a light-emitting diode) are efficient at producing red and yellow light, but the pumped blue light (used as excitation light) is typically absorbed. As a result, the output must be color corrected by adding blue light in order to create white light. In the light conversion devices and systems disclosed herein, blue light is redirected by the incorporation of one or more dielectric interference particles in conjunction with one or more phosphors in the wavelength conversion element. The phosphor(s) and the dielectric interference particle(s) may be present in the same layer, or may be segregated in separate layers.

The light conversion devices of the present disclosure include a substrate and at least one wavelength conversion element secured to a front surface thereof. The substrate is typically a metal having a high thermal conductivity, e.g. aluminum or an aluminum alloy, copper or a copper alloy, silver or a silver alloy, or another metal having a high thermal conductivity. The substrate could also, for example, be made of glass, sapphire, aluminum oxynitride (AlON), spinel ($MgAl_2O_4$), or diamond. The substrate can, when desired, include a mirrored or reflective coating or can be made from a reflective material. For example, the reflective material/reflective coating can be made from a metallic material, a dielectric material, or a combination thereof.

Examples of metallic materials include the metals and metal alloys previously identified. Examples of dielectric materials include magnesium fluoride, silicon dioxide, tantalum pentoxide, zinc sulfide, silicon nitride, niobium oxide, titanium dioxide. In cases where the reflective coating is a multilayer dielectric coating or a multilayer metallic coating, the materials are usually applied in a sequence of layers to produce an interference effect that increases the reflection over the desired spectral band.

The wavelength conversion element comprises at least one host material, at least one phosphor, and one or more dielectric interference particles. In some embodiments, the phosphor(s) and the dielectric interference particle(s) are located within a common host material. The phosphor(s) and the dielectric interference particle(s) can be evenly dispersed throughout the common host material, to form a single layer. In other embodiments, the phosphor(s) and the dielectric interference particle(s) are distributed at different heights in the common host material, resulting in (A) a phosphor layer containing the phosphor(s) and the host material; and (B) a particle layer containing the dielectric interference particle (s) and the host material. The phosphor layer does not contain any dielectric interference particle(s), and the particle layer does not contain any phosphor(s). In still other embodiments, the phosphor layer and the particle layer are two separate layers with differing host materials. This embodiment can be described as (A) a phosphor layer containing the phosphor(s) and a first host material; and (B) a particle layer containing the dielectric interference particle (s) and a second host material. The first and second host materials can be the same, or can be different materials. The host material may or may not be homogeneous.

The host material(s) used to make the wavelength conversion element should ideally have a combination of several properties. The host material should have high transparency at the pump and emission wavelengths; high bonding strength; high thermal stability (i.e. a high Tg or maximum operating temperature); a relatively low curing/sintering temperature; good compatibility/miscibility with the phosphor; and/or desirable viscosity. This will enhance the thermal endurance of the wavelength conversion elements.

The host material may be an optical glue or adhesive, glass, a ceramic, a silicone, an epoxy, a plastic (e.g. styrene, a styrene-acrylic copolymer such as NAS®, polycarbonate, polyolefin, polymethylmethacrylate) or so forth. In some particular embodiments, the host material is an inorganic binder. The term "inorganic" means the host material does not contain any hydrocarbon.

Desirably, the inorganic binder has a coefficient of thermal expansion (CTE) of about 0.5 to about 25 ppm/° C. In particular embodiments, the inorganic binder is sodium silicate. Sodium silicate is the common name for compounds of the formula $(Na_2SiO_3)n$, and can alternatively be considered a polymer, as seen below in Formula (I).

Formula (I)

Sodium silicate has both an anhydrous form and a hydrated form $Na_2SiO_3 \cdot nH_2O$, where n=5, 6, 8, or 9. Sodium silicate can be characterized by the weight ratio of silicon dioxide ($SiO_2$) to sodium oxide ($Na_2O$). The weight ratio of $SiO_2$:$Na_2O$ may vary from 2:1 to 3.75:1. In particular embodiments, the weight ratio of $SiO_2$:$Na_2O$ is from about 2.5:1 to about 3.75:1, or about 2:1 to about 3:1. Sodium silicate is typically provided as an aqueous solution.

In other embodiments, the inorganic binder can be made from other inorganic materials besides sodium silicate. Those inorganic materials can be silicates, aluminates, phosphates, borates, or inorganic sol-gels. Examples of inorganic sol-gels include sol-gels made from silicon dioxide ($SiO_2$) or aluminum oxide ($Al_2O_3$).

The inorganic binder, particularly sodium silicate, can exhibit a greater bonding strength than conventional silicone adhesives. In particular embodiments, the inorganic binder of the present disclosure can have an initial bonding strength of at least 100 psi, or at least 200 psi, or from about 100 psi to about 600 psi. This property is measured using two aluminum test plates with the inorganic binder placed between the two plates at a thickness of 0.1 mm and a bonding area of 169 square mm, at the maximum temperature at which the adhesive is applied, for example at 300° C.

Desirably, the host material is substantially optically transparent (e.g., the host material has a light transmittance of at least 80%, including 90% and up to 98%, or up to 100%). This is measured, for example, by using a Lambda 950 spectrophotometer available from Perkin-Elmer at a thickness of about 0.1 to about 0.2 millimeters.

In this regard, it has been found that inorganic materials are usually long-term stable and therefore performance of these devices does not necessarily degrade significantly over time. Moreover, organic materials can exhibit some outgassing at high working temperatures. This may result in contamination of nearby components in an optical device. Additionally, inorganic binders may be more durable than traditional organic adhesive materials (such as silicone materials) in high power conditions. They can also be flexibly made into various sizes, shapes, and thicknesses. They exhibit reliable operation under high laser irradiance and temperature, namely high working temperatures in excess of 200° C. In certain embodiments, they can be used in high-power laser projection display systems where the solid-state laser projector can be equipped with laser power from about 60 watts to about 300 watts, including in excess of 100 watts. The working temperature of such devices can reach above 200° C. to enable high luminous brightness.

Next, the wavelength conversion element comprises phosphor particles (e.g. one or more phosphor powders; also referred to herein as "phosphor") for converting the excitation light to other wavelengths. It is specifically contemplated that the wavelength conversion element includes at least one green light-emitting phosphor, red light-emitting phosphor, or yellow light-emitting phosphor. The wavelength conversion element may contain only one phosphor, or can contain two phosphors, or more than two phosphors as desired. In particular embodiments where the light conversion device/wavelength conversion element are static, it is contemplated that the wavelength conversion element has two or more phosphors which emit light of different wavelengths. For example, the wavelength conversion element may include a red light-emitting phosphor and a yellow light-emitting phosphor. Examples of phosphors that may be used (by way of non-limiting illustration) include yttrium aluminum garnet (YAG), cerium-doped YAG (YAG:Ce), lutetium YAG (LuYAG), silicate-based phosphors, and silicon-alum inum-oxynitride (SiAlON) phosphors. The phosphors can have a particle size of from about 5 microns to about 100 microns.

The wavelength conversion element also comprises one or more dielectric interference particles. The dielectric interference particles are typically comprised of small flakes or grains of multilayer dielectric material that reflect blue light (either wholly or partially). This permits a high degree of tunability for the desired performance/amount of reflectance without introducing high amounts of loss or heating into the wavelength conversion element. Examples of dielectric interference particles that can be used include simple long pass filters with low reflectance (usually less than 10%, ideally 0%) at the emission wavelengths and reflectivity at the pump wavelength between 5% and 80% when measured at normal incidence in plane wave illumination. The amount of blue light that is reflected can be changed by tuning the reflectance of the dielectric interference particle(s), as well as by changing the amount of particles in the wavelength conversion element. Some transmission of blue light (e.g. about 20% to about 95%) through a dielectric interference particle is also desirable. A key aspect is that the dielectric interference particle at most minimally absorbs light—light is either reflected or transmitted.

The multilayer dielectric structure that makes up each dielectric interference particle is made up of a sequence of thin film layers. These layers consist of two or more materials with appropriate optical properties to produce the required performance. The number of layers in a given particle can generally vary from one (1) layer to several thousand layers. However, in particular embodiments, the dielectric interference particle has from five (5) to eleven (11) discrete layers.

A typical dielectric interference particle consists of discrete layers of two different types of materials, a high index material and a low index material. Materials with a lower speed of light (when light passes through the material) are high index materials, and materials with a higher speed of light are low index materials. Typically, there will be a cutoff or threshold value between the high index materials and low index materials for a given dielectric interference particle. Examples of materials include oxides such as Titania ($TiO_2$), Niobia ($Nb_2O_5$), Hafnia ($HfO_2$), Alumina ($Al_2O_3$), and Silica ($SiO_2$); Sulfides such as zinc sulfide (ZnS); Selenides such as zinc selenide (ZnSe); Semiconductors such as Germanium (Ge) or Silicon (Si); and many other materials common in the field of optical interference coatings. These materials can also be blended or alloyed to produce layers with intermediate properties. The material choice for the dielectric interference particle is governed by a wide range of physical attributes of each material and is application specific.

In the fabrication of the dielectric interference particles, the selected materials should have low absorption at the excitation wavelength and over the emission wavelength of the phosphor. The materials in the dielectric interference particles should also be inert to the host material and stable over the range of temperatures to which they will be exposed in both the fabrication and application environments. In preferred embodiments, the materials of choice for use in the dielectric interference particles with a blue pump are oxides.

Figure 4:
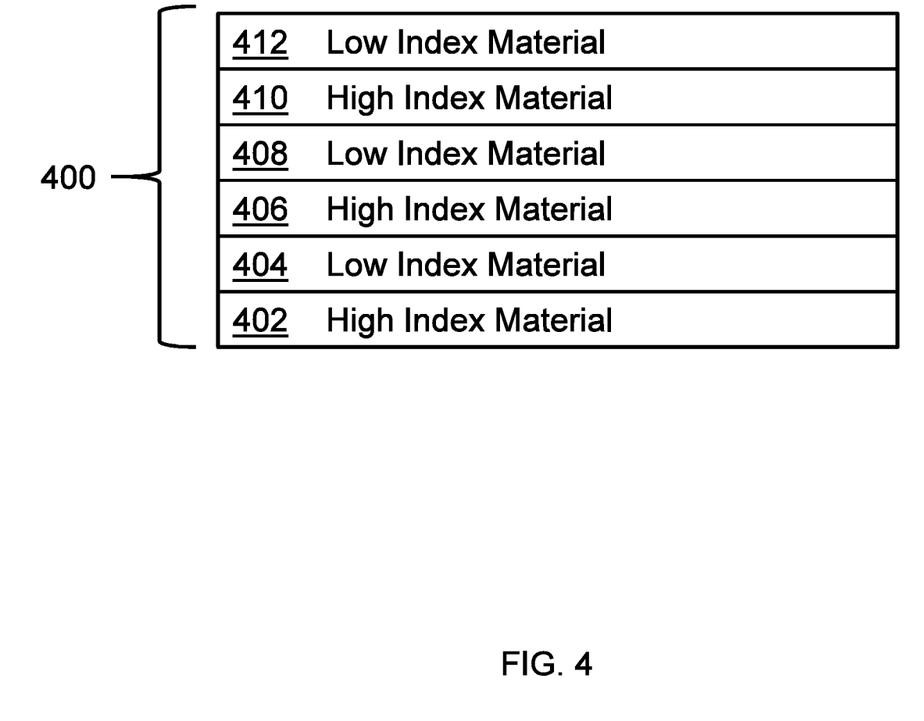
FIG. 4 is a cross-sectional view of a dielectric interference particle. This embodiment is drawn as having six layers, alternating between two materials.

FIG. 4 is a cross-sectional view of a dielectric interference particle 400. Here, the particle 400 is illustrated as being made up of six layers 402, 404, 406, 408, 410, 412. The layers alternate between high index material (402, 406, 410) and low index material (404, 408, 412). The high/low index material can be a different material in each layer, or can be the same material.

The dielectric interference particles can be prepared by various methods. In one method, a film of cryolite ($Na_3AlF_6$) is used as a release layer on a suitable substrate. Alternating coatings of high and low index materials are applied to form layers and build up the dielectric interference particles. The cryolite film can then be dissolved in water, and the dielectric interference particles can then be broken up into flakes or grains. In another method, a continuous deposition system can be used, with a roll of flexible material as the substrate upon which the coatings of high and low index materials are applied to form a film. As the belt is bent by a roller of sufficiently small radius of curvature, the film will delaminate from the substrate into flakes or grains.

The weight ratio of the phosphor to the host material is from about 1:1 to about 5:1, i.e. there can be more phosphor than host material, including from about 1:1 to about 3:1 and from about 1:1 to about 2:1.The dielectric interference particle(s) may be present in the host material in an amount sufficient to match the output of the phosphor(s) to create light of the desired color and/or color temperature, including white light output. It is noted that the dielectric interference particles may be randomly oriented/distributed in the host material.

Three different embodiments are specifically contemplated. In the first embodiment, the phosphor(s) and the one or more dielectric interference particles are dispersed throughout the thickness of the host material, such that the wavelength conversion element is made of a single layer. The layer may have a uniform distribution of the particle(s) and phosphor(s), or the relative distribution of the constituents may vary throughout the thickness of the layer.

In the second embodiment, the phosphor(s) and the dielectric interference particle(s) are located at different heights through the thickness of the host material. Put another way, the wavelength conversion element can be considered as being made from at least one phosphor layer and at least one particle layer. The phosphor layer(s) contains the phosphor(s) and the host material, and does not contain any dielectric interference particles. The particle layer(s) contains the one or more dielectric interference particles, and does not contain the phosphor(s). In this second embodiment, the same host material is generally used in the two different layers. The layers would be made using separate dispersions/mixtures which are sequentially applied.

The third embodiment is similar to the second embodiment, except different host materials are used for the phosphor layer(s) and the particle layer(s). The phosphor layer contains the phosphor(s) and a first host material, and does not contain any dielectric interference particles. The particle layer(s) contains the one or more dielectric interference particles and a second host material, and does not contain the phosphor(s). The layers would be made using separate dispersions/mixtures which are sequentially applied.

The wavelength conversion element can be made in any desired shape, for example by injection molding the dispersion(s) (containing host material, phosphor, and dielectric interference particle) in a mold, or by applying to the surface of a substrate fabricated through machining or polishing, or hot pressing and sintering to a desired shape. Generally, the wavelength conversion element can have any arbitrary shape, such as a rectangular shape or an annular shape or a semi-annular shape. These may be useful in static and phosphor wheel applications, respectively. Other shapes, such as parabolas or hyperbolas, may be used for specialized lighting applications. The resulting wavelength conversion element typically can have a thickness of about 0.05 mm to about 0.3 mm.

The wavelength conversion element can be secured to the front surface of the substrate by a suitable bonding material. Some contemplated bonding materials include epoxy, glue, solder, adhesive silicone (optionally a reflective silicone material including dispersed light-reflective particles such as dispersed alumina particles), or so forth. If the bonding material is sufficiently reflective for the phosphor-emitted light (e.g. reflective silicone), then a separate reflective coating between the substrate and the wavelength conversion element (as described above) may not be needed. Alternatively, a mechanical fixture could be used for securing the wavelength conversion element to the substrate. As another alternative, the host material itself may be used to bond the wavelength conversion element to the substrate.

Alternatively, the host material, one or more phosphors, and one or more dielectric interference particles could be mixed together to form a paste that is then applied to the substrate in the desired area. The paste can be applied, for example, by dispensing, spraying, brushing, or silk printing of the paste. In applications where the paste is to be applied by dispensing or silk printing, the paste should have a suitable viscosity of from about 0 to about 5,000 centipoise (cP), including from about 0 to about 2,000 cP, or from about 100 cP to about 2,000 cP), of from about 0 to about 2,500 cP, or from about 100 cP to about 2,500 cP. The viscosity is measured using a Brookfield DVE SLVTJO viscometer, or according to ASTM D1084. The host material by itself (i.e. no phosphor) can also have a suitable viscosity of from about 0 to about 5,000 centipoise (cP), including from about 0 to about 2,000 cP, or from about 100 cP to about 800 cP.

The paste is then cured to obtain the wavelength conversion element on the substrate of the wavelength conversion device. The curing can be performed by thermal curing at a temperature of from about 100° C. to about 500° C.

The wavelength conversion element can also include one or more fillers, one or more inorganic materials, and one or more dispersants.

The addition of filler(s) can enhance the bonding strength of the host material. In particular, the addition of the filler(s) can reduce the shrinkage rate of the composition used to make the wavelength conversion element, reducing or preventing the formation of bubbles or cracks during solidification, thereby decreasing the amount and/or effect of stress during use and improving the bonding strength of the composition. The filler(s) can be chosen to have a thermal expansion coefficient that is as close as possible (e.g., substantially equivalent to) the thermal expansion coefficient of the other materials in the wavelength conversion element. Similarly, to avoid stratification, the filler(s) can be chosen to have a density that is as close as possible (e.g., substantially equivalent to) the density of the other materials in the wavelength conversion element. The filler(s) may have any desired shape, such as a granular, flaky, or fibrous shape. Any suitable filler(s) can be used. For example, it is specifically contemplated that that the filler(s) could be silica, a silicate, an aluminate, or a phosphate, or diamond powder. The filler could be a metal powder, such as aluminum, copper, silver, or gold powder. The filler could be a nitride, such as aluminum nitride or borazon. The filler could be an oxide, such as aluminum oxide or boron oxide. The filler could be a metallic oxide, metal nitride, or metal sulfide.

The addition of the dispersant(s) is beneficial to disperse the filler(s) throughout the host material, thereby avoiding undesirable aggregation or sedimentation. Any suitable dispersant(s) can be used. For example, it is specifically contemplated that the dispersant(s) could be an organic dispersant, such as polyvinylpyrrolidone, polyacrylate, gelatin, polyvinyl alcohol, cellulose, styrene-co-maleic anhydride, or lignosulfate. It is specifically contemplated that, alternatively, the dispersant(s) could be an inorganic dispersant, such as hexametaphosphate, silicate, polyphosphate, or fumed silica. Additional information on other variations is provided in PCT Application No. PCT/CN2017/102468, the entirety of which is incorporated by reference herein.

Figure 1A:
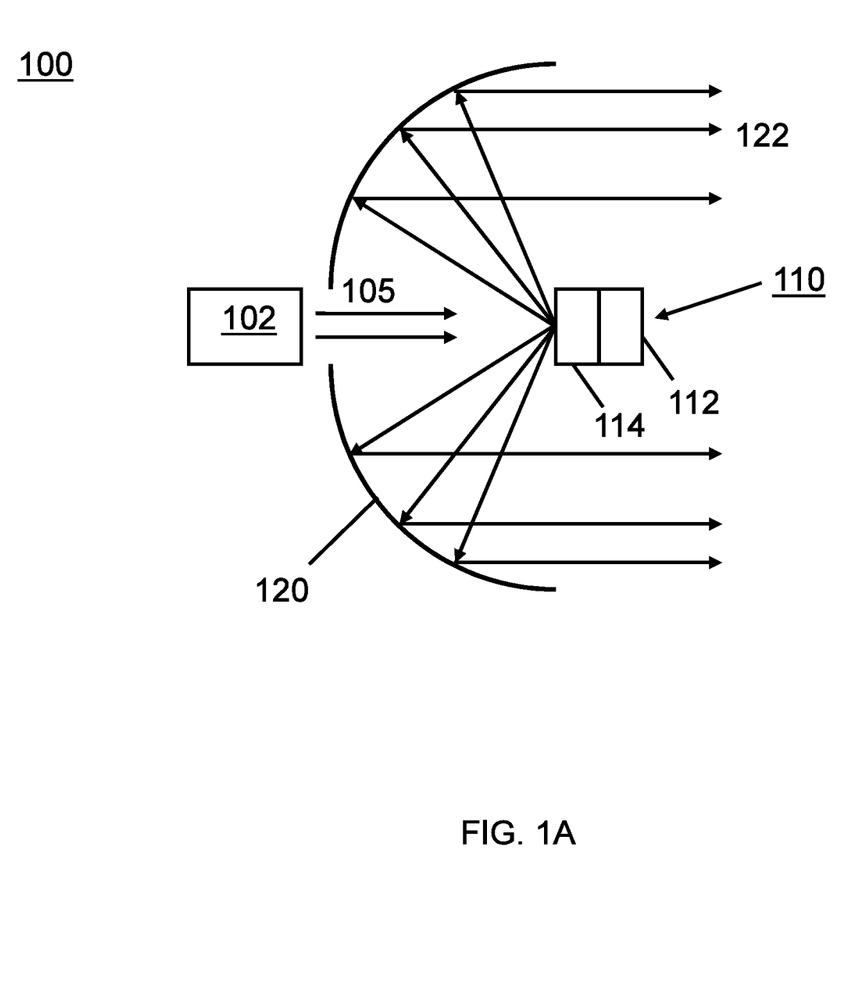
FIG. 1A is a diagram illustrating an exemplary embodiment light conversion device of the present disclosure. Here, the light source is oriented so that pump light is normal to the surface of the wavelength conversion element.

FIG. 1A is a cross-sectional view of an example of a light conversion device and system 100. An excitation light source 102 is located on the left-hand side, and provides blue light. The light conversion device 110 includes a substrate 112 and a wavelength conversion element 114. Here, the wavelength conversion element includes a red light-emitting phosphor, a yellow light-emitting phosphor, and the dielectric interference particles dispersed in a host material. The light conversion device is located at the focal point of a reflector 120, and the excitation light source is located outside of the reflector. Put another way, the reflector is located between the excitation light source and the light conversion device. Note that in three dimensions, the reflector is semi-spherical, with a hole for the excitation light to pass through.

In operation, the light source 102 directs excitation light 105 to the light conversion device 110. Three different colors (blue, red, and yellow) are subsequently emitted or reflected by the light conversion device back towards the light source (reference numeral 122). The light is subsequently gathered by the reflector 120 and directed outwards beyond the light conversion device 110.

Figure 1B:
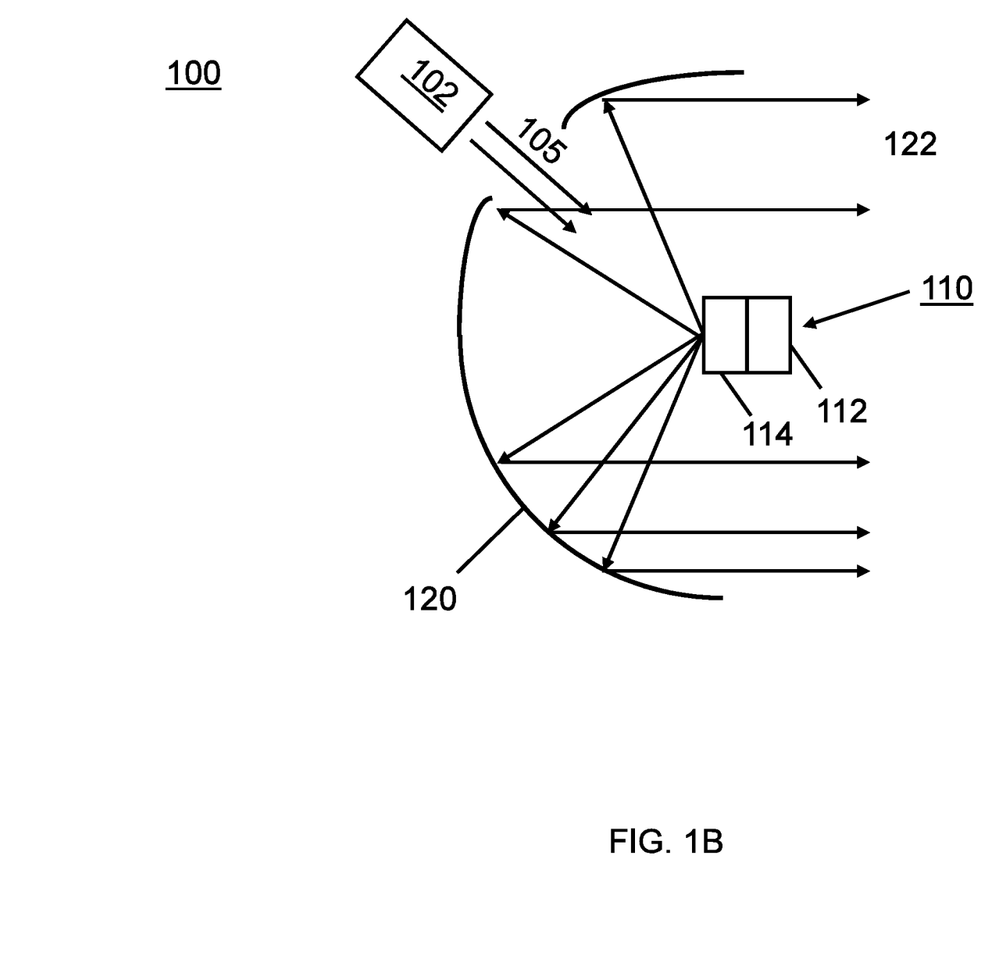
FIG. 1B is a diagram illustrating a second exemplary embodiment of a light conversion device of the present disclosure. Here, the light source is oriented so that pump light contacts the surface of the wavelength conversion element at a 45° angle.

It is noted that the light conversion device 110 can be illuminated by the light source 102 at any angle, as the phosphor response and the dielectric interference particle response are both largely Lambertian. This is illustrated in FIG. 1B. Here, the light source 102 is at a 45° angle relative to the light conversion device 110, instead of 0° as in FIG. 1A. The light is collected in the hemisphere around the specular reflection using an off-axis parabola, providing a uniform output beam.

Figure 2A:
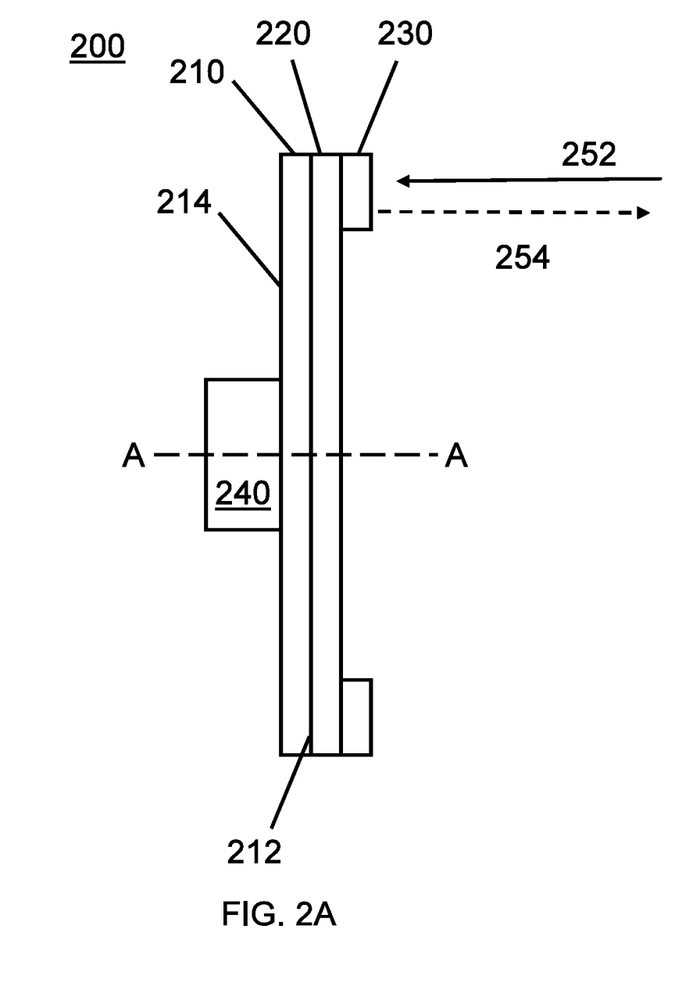
Figure 2B:
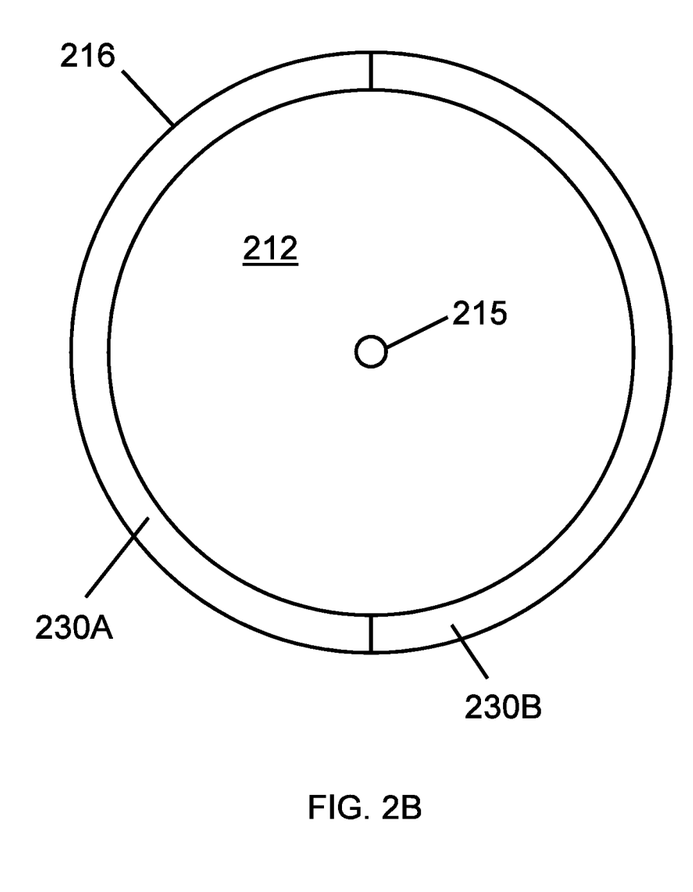

FIG. 2A and FIG. 2B illustrate an example of a rotatable light conversion device of the present disclosure, in the form of a phosphor wheel. FIG. 2A is a side cross-sectional view, and FIG. 2B is a front view.

Referring first to FIG. 2A, the phosphor wheel 200 includes a substrate 210 having a front surface 212 and a rear surface 214. A reflective layer 220 is applied upon the front surface 212. Wavelength conversion elements 230 are applied over the reflective layer 220 on the substrate 210. The substrate 210 is mounted on a motor 240 to rotate with high speed. The phosphor wheel rotates around axis A-A, which is normal to the planar surfaces of the substrate 210.

As seen in FIG. 2B, one or more wavelength conversion elements 230 are secured or attached to the front surface 212 of the substrate. In particular, the substrate is circular/disk-shaped, and the wavelength conversion elements are attached at the outer perimeter 216 of the substrate. The center of the substrate is marked with reference numeral 215. The wavelength conversion elements have a semi-annular shape. In the depicted embodiment, two wavelength conversion elements 230A and 230B are illustrated, each having an arc of about 180 degrees, so that the entire perimeter is occupied by the two elements. The elements 230A and 230B contain phosphor that emit different colors, but both contain the dielectric interference particle(s) that reflects blue light. For example, element 230A will emit red light and reflect blue light. Element 230B will emit yellow light and reflect blue light. It should be understood that as many conversion elements can be employed as desired, and that each element can occupy as much of an arc as desired.

Referring back to FIG. 2A, in operation, excitation light (solid line, reference numeral 252) from a light source (not shown) is directed at the wavelength conversion elements 230 on the outer perimeter. The light emitted by the phosphor (dotted line, reference numeral 254) can reflect off of the reflective layer 220 and can then be collected. As the phosphor wheel rotates, light of different colors can be obtained.

Figure 3A:
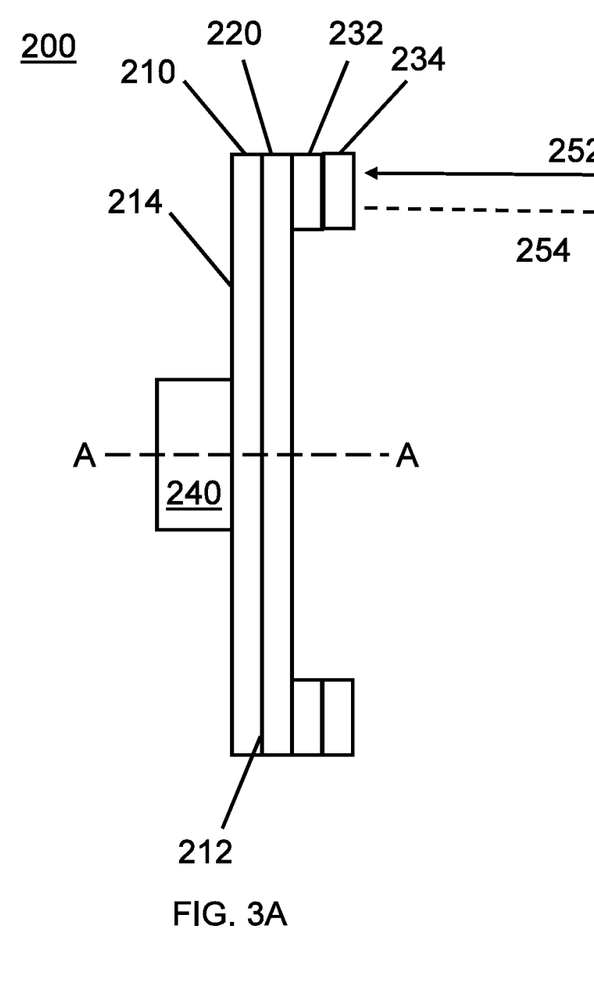
Figure 3B:
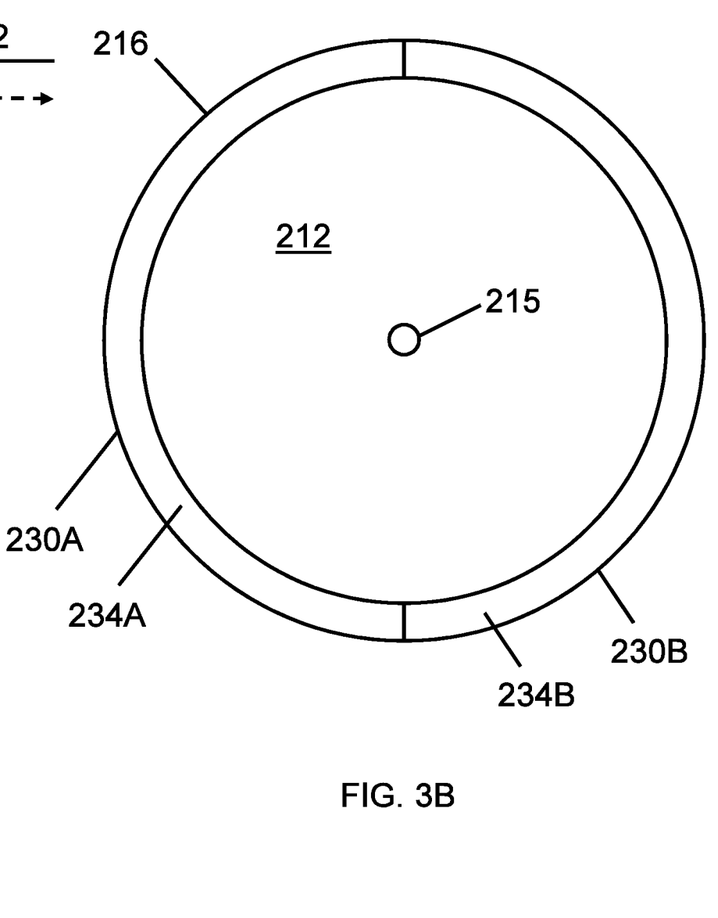

FIG. 3A and FIG. 3B illustrate another example of a rotatable light conversion device of the present disclosure, in the form of a phosphor wheel. FIG. 3A is a side cross-sectional view, and FIG. 3B is a front view.

Referring first to FIG. 3A, the phosphor wheel 200 is very similar to that of FIG. 2A, and the same reference numerals are used. The significant difference here is that the wavelength conversion element is made of two layers, a phosphor layer 232 and a particle layer 234. As seen here, the phosphor layer 232 is adjacent the substrate 210, and the particle layer 234 is adjacent the phosphor layer 232. Put another way, the phosphor layer 232 is between the particle layer 234 and the substrate 210. The pumped excitation light will pass through the particle layer 234 before entering the phosphor layer 232.

In FIG. 3B, the particle layers 234A, 234B of the two wavelength conversion elements 230A and 230B are seen. The phosphor layer is located below the particle layer in each wavelength conversion element.

The wavelength conversion elements described herein produce light that is color corrected to produce white light, and can be used at high power levels and radiance.

The light conversion devices can include additional layers. For example, the wavelength conversion element can be located upon a reflective layer or coating applied to the substrate. The reflective layer can be made from a metallic material, a dielectric material, or a combination thereof. Dielectric mirrors are known in the art. When the reflective layer is a metallic material, it is usually made from a metal that is different from the metal used to make the substrate.

In further embodiments, a smoothing layer can be applied upon the wavelength conversion element. The smoothing layer serves the function of reducing the surface roughness of the final device, without the use of mechanical processes such as polishing which can damage the final device. This reduces scatter, improving the efficiency of the wavelength conversion and improving the ability to direct the resulting light in desired directions.

Additional top coatings can be applied to the device as well. Such coatings can be transparent, anti-reflective, or spectrally selective coatings, as desired for various applications. An anti-reflective coating reduces phosphorescence reflection losses at the surface, thus raising the external phosphorescence output to a level closer to the internal phosphorescence level.

In some embodiments, the surface of the wavelength conversion elements can be engineered to have surface nanostructures. In illustrative embodiments, these surface nanostructures are generally conical in shape and have lateral dimensions less than the wavelength of the phosphorescence light. In the presence of such surface nanostructures, the phosphorescence light interacts with the interface not as an abrupt refractive index change from the refractive index of the host material to $n_0$=1.00 of air; but rather as a gradual change in effective refractive index that gradually changes from the refractive index of the host material to 1.00 over the height of the surface nanostructures. In general, higher surface nanostructures provide a more gradual effective transition, and provide an enhanced phosphorescence transmission over a larger bandwidth. Such nanostructures are described in U.S. patent application Ser. No. 15/429,600, the entirety of which is incorporated by reference herein.

It is contemplated that the wavelength conversion elements described herein can be used in phosphor wheels and in laser projection display systems. They can also be used in conjunction with a solid-state illumination source, for example in automotive headlights.

The present disclosure has been described with reference to exemplary embodiments. Modifications and alterations will occur to others upon reading and understanding the preceding detailed description. It is intended that the present disclosure be construed as including all such modifications and alterations insofar as they come within the scope of the appended claims or the equivalents thereof.

The invention claimed is:

1. A wavelength conversion element, comprising:
at least one host material;
one or more phosphors within the host material; and one or more dielectric interference particles within the host material, wherein the one or more dielectric interference particles are formed from alternating thin film layers of at least one high index material and at least one low index material.

2. The wavelength conversion element of claim 1, wherein the one or more dielectric interference particles have from 5 to 11 layers.

3. The wavelength conversion element of claim 1, wherein the at least one high index material and the at least one low index material are independently selected from the group consisting of Titania ($TiO_2$), Niobia ($Nb_2O_5$), Hafnia ($HfO_2$), Alumina ($Al_2O_3$), Silica ($SiO_2$), zinc sulfide (ZnS), zinc selenide (ZnSe), Germanium (Ge), and Silicon (Si).

4. The wavelength conversion element of claim 1, wherein the one or more dielectric interference particles are in the form of flakes or grains comprising a plurality of thin film layers.

5. The wavelength conversion element of claim 4, wherein each dielectric interference particle flake or grain has a lateral dimension that is less than 100 micrometers.

6. The wavelength conversion element of claim 1, wherein the one or more dielectric interference particles at least partially reflect blue light.

7. The wavelength conversion element of claim 1, wherein the host material is a single host material, and wherein the one or more phosphors and the one or more dielectric interference particles are dispersed throughout the single host material to form a single layer.

8. The wavelength conversion element of claim 1, wherein the host material is a single host material, and wherein the wavelength conversion element includes (A) at least one phosphor layer formed from the one or more phosphors and the host material, and (B) at least one particle layer formed from the one or more dielectric interference particles and the host material.

9. The wavelength conversion element of claim 1, wherein the host material includes a first host material and a second host material, and wherein the wavelength conversion element includes (A) at least one phosphor layer formed from the one or more phosphors and the first host material, and (B) at least one particle layer formed from the one or more dielectric interference particles and the second host material.

10. The wavelength conversion element of claim 1, wherein the one or more phosphors includes at least one phosphor selected from the group consisting of a green light-emitting phosphor, a red light-emitting phosphor, and a yellow light-emitting phosphor; or
wherein the host material is glass, a ceramic, a silicone, an epoxy, a plastic, an optical glue, an adhesive, or an inorganic binder.

11. An light conversion device, comprising:
a substrate; and
a first wavelength conversion element secured to a front surface of the substrate, wherein the first wavelength conversion element comprises a phosphor and one or more dielectric interference particles within at least one host material, wherein the one or more dielectric interference particles are formed from alternating thin film layers of at least one high index material and at least one low index material.

12. The light conversion device of claim 11, wherein the substrate is in the shape of a disk, and the first wavelength conversion element is located on an outer perimeter of the substrate.

13. The light conversion device of claim 12, further comprising a second wavelength conversion element having a phosphor that emits a different color than the phosphor of the first wavelength conversion element.

14. A method of making a wavelength conversion element, comprising:
dispersing a phosphor and one or more dielectric interference particles in a single host material to make a dispersion, wherein the one or more dielectric interference particles are formed from alternating thin film layers of at least one high index material and at least one low index material; and
forming the dispersion into the wavelength conversion element, wherein at least a portion of a surface of the wavelength conversion element is configured to have surface nanostructures.

15. The method of claim 14, further comprising injecting the dispersion into a mold that defines a shape of the wavelength conversion element.

16. The method of claim 15, wherein the wavelength conversion element has a semi-annular shape or a rectangular shape, or a parabolic or a hyperbolic shape.

17. A method of making a wavelength conversion element, comprising:
forming a phosphor layer from a mixture comprising a phosphor and a first host material; and
forming a particle layer on the phosphor layer, wherein the particle layer is formed from a mixture comprising one or more dielectric interference particles and a second host material, wherein the one or more dielectric interference particles are formed from alternating thin film layers of at least one high index material and at least one low index material.

18. The method of claim 17, further comprising curing the phosphor layer and the particle layer.

19. The method of claim 17, wherein the first host material and the second host material are different from each other.

20. A method for generating white light, comprising:
applying blue light to a wavelength conversion element comprising a phosphor layer and a particle layer, wherein the phosphor layer is disposed between the particle layer and a substrate, the phosphor layer comprising one or more phosphors and a first host material, the particle layer comprising one or more dielectric interference particles and a second host material,
wherein the one or more dielectric interference particles are formed from alternating thin film layers of at least one high index material and at least one low index material.

21. A wavelength conversion element, comprising:
a phosphor layer comprising one or more phosphors and a first host material; and
a particle layer comprising one or more dielectric interference particles and a second host material;
wherein the one or more dielectric interference particles are formed from alternating thin film layers of at least one high index material and at least one low index material;
wherein the phosphor layer is substantially free of dielectric interference particles and the particle layer is substantially free of phosphors.

22. The wavelength conversion element of claim 21, wherein the first and second host materials are different materials.

23. The wavelength conversion element of claim 21, wherein each thin film layer of at least one high index material includes a different high index material and each thin film layer of at least one low index material includes a different low index material.

* * * * *